Figure 1:
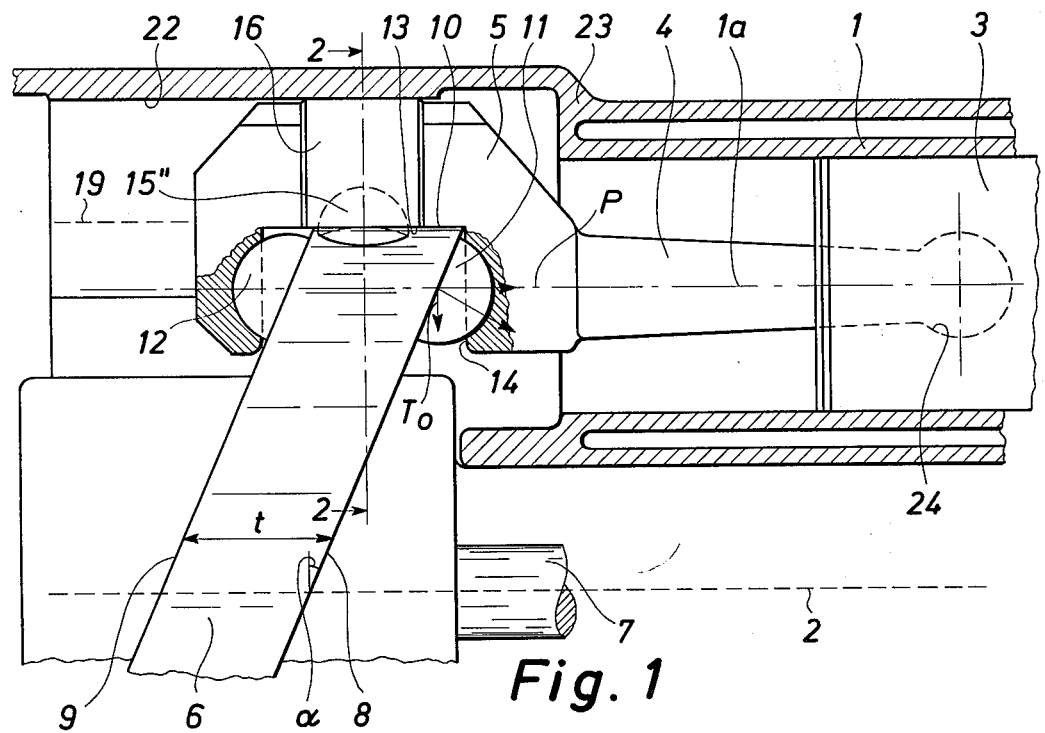

United States Patent

Rasmussen

[11] 3,938,397
[45] Feb. 17, 1976

[54] POWER TRANSMITTING MECHANISM

[75] Inventor: Gunnar Olaf Vestergaard Rasmussen, Odense, Denmark

[73] Assignee: Havera Development Ltd., London, England

[22] Filed: July 30, 1974

[21] Appl. No.: 493,144

[30] Foreign Application Priority Data
Aug. 15, 1973  Denmark............................ 4491/73

[52] U.S. Cl.................. 74/60; 123/58 BA; 417/269
[51] Int. Cl.² ... F16H 23/00; F22B 9/08; F04B 1/12
[58] Field of Search...... 123/58 AA, 58 AB, 58 BA, 123/58 BB; 417/269; 74/60

[56] References Cited
UNITED STATES PATENTS

| | | | |
|---|---|---|---|
| 1,804,010 | 5/1931 | Greening........................ | 123/58 BA |
| 1,897,771 | 2/1933 | Sherman.......................... | 123/58 B |
| 2,491,011 | 12/1949 | Michell.............................. | 74/60 |
| 2,672,095 | 3/1954 | Lucien.............................. | 417/269 |
| 2,877,653 | 3/1959 | Masnik et al........................ | 74/60 |

Primary Examiner—William L. Freeh
Assistant Examiner—G. P. LaPointe
Attorney, Agent, or Firm—Haseltine, Lake & Waters

[57] ABSTRACT

A power transmitting mechanism for reciprocating engines or pumps connecting the piston rods of a plurality of cylinders with a slant on a main shaft, the cylinder axes being parallel with the main shaft. The connection is provided by means of claw-shaped crossheads gripping the slant, one crosshead for each piston rod. Between the crosshead and the slant a main thrust block and a back thrust block are placed eccentrically. The crosshead may pivot around its longitudinal axis and is provided with two thrust blocks of the Michell type, the centres of these two blocks being arranged in a plane perpendicular to the longitudinal axis of the crosshead and in the middle of the gap of the crosshead. Said two thrust blocks are further adapted to slide on the cylindrical edge surface of the slant, so that, in common or individually together with a relatively short external bearing supporting surface of the crosshead, they absorb the transverse components of the rotating transverse force vector, the bearing supporting surface co-operating with an axially extending semicircular sliding guide of the engine or pump housing.

4 Claims, 11 Drawing Figures

POWER TRANSMITTING MECHANISM

This invention relates to a power transmitting mechanism for reciprocating engines or pumps comprising a plurality of cylinders arranged circumferentially around the main axis of the engine or pump, the cylinder axes being parallel to the main axis and each piston being connected to a clawshaped crosshead by way of a piston rod, which crosshead grips a slant fixed to the main shaft of the engine or pump and abuts on the side surfaces of the slant by a main thrust block and a back thrust block, supplementary thrust blocks being provided for absorbing the force components perpendicular to the main shaft.

Use of slants or swash-plates for converting the axial movement of the pistons to a rotation of the engine shaft involves large side pressures on the crossheads of the power transmitting mechanisms. In order to prevent the heads from pivoting, the crossheads must slide in particular longitudinal guides.

The object of the invention is to provide a power transmitting mechanism of the above-mentioned kind permitting of absorbtion of said crosshead side pressures without edge pressures and without using longitudinal guide ways in the engine or pump housing.

An essential feature of the power transmitting mechanism in accordance with the invention is that the main thrust block and the back thrust block are placed eccentrically in the crosshead and that the latter is pivotally journalled around its longitudinal axis and provided with two thrust blocks, preferably of the Michell type, the centres of the thrust blocks being arranged in a plane perpendicular to the longitunal axis of the crosshead and in the middle of the gap of the crosshead-claw, the two thrust blocks being adapted to slide on the cylindrical edge surface of the slant so that, in common or individually together with a relatively short external bearing supporting surface of the crosshead, they absorb the transverse components of the rotating transverse force vector, the bearing supporting surface co-operating with an axial semicircular sliding guide of the engine or pump housing. The result obtained is that — through the semicircular sliding guide — the engine or pump housing can absorb said crosshead side pressure efficiently, since no edge pressure can occur at the crosshead. Through the thrust blocks sliding on the edge surface, the crosshead can easily transmit the transverse force component pointing in towards the main axis of the mechanism. At any time, the thrust blocks sliding on the edge surface together with said short bearing supporting surface will perform the function of absorbing the torque acting on the crosshead due to the outward component of the transverse force vector as well as the tipping torque due to the component of the transverse force vector, said component pointing in towards the main axis of the mechanism. A hydrodynamic lubrication always will be provided at the thrust blocks and the short bearing supporting surface.

The mechanism in accordance with the invention may have the essential feature that the bearing supporting surface of the crosshead has a semicircular cross section and a shape close to that of a barrel or possibly a sphere, which surface extends symmetrically about a transverse plane through the centres of the thrust blocks sliding on the edge surface of the slant and furthermore extends symmetrically about a longitudinal plane through the main axis and the longitudinal axis of the crosshead, and that the longitudinal axis of the bearing supporting surface is co-extensive with the longitunal axis of the crosshead. This results in a further reduced risk of edge pressures at the bearing supporting surface of the crosshead when the latter turns slightly, and in improved possibilities of good lubrication of the bearing supporting surface.

The mechanism in accordance with the invention further may have the essential feature that the bearing supporting surface of the crosshead comprises one ore more external thrust blocks whose centres are arranged in same transverse plane as the thrust blocks sliding on the cylindrical edge surface of the slant, the external thrust block or blocks being situated symmetrically about a longitudinal plane which extends through the main axis of the engine and the longitudinal axis of the crosshead, the external thrust blocks further being arranged so close to the longitudinal edges of the semicircular bearing supporting surface that, partly, there is a possibility of certain side movements of the piston ball connection to the piston rod being absorbed, partly a possibility of total hydrodynamic bearing (lubrication) of the crosshead is obtained, and that a relatively large clearance is provided between the crosshead body and the opposite sliding guide of the housing, which guide is touched by the thrust blocks. Hereby particularly good possibilities of hydrodynamic lubrication of the external thrust blocks are obtained, as well as it is ensured that the bearing force transmitted from the crosshead to the sliding guide of the housing will pendulate within a certain angle so that no edge pressures will occur.

According to the invention, the external thrust blocks and the thrust blocks sliding on the edge surface of the slant are paired off on protruding ball-shaped supporting portions fastened centrally above the crosshead gap. Thus the external thrust block may be placed particularly close to the edge of the sliding guide (of the housing), in which the crosshead moves axially.

In accordance with the invention, a mechanism, in which the crosshead and the piston rod are connected by way of a ball-and-socket joint, may have the essential feature that the external bearing supporting surface comprises two sets of outer thrust blocks, each set being situated in separate transverse planes, which are arranged substantially symmetrically about and spaced from the transverse plane in which the centres of the thrust blocks sliding on the edge surface of the slant are situated, said spacing preferably being larger than or equal to half of the slant thickness measured in axial direction, and that each set of thrust blocks consists of one or more thrust blocks arranged substantially symmetrically about a longitudinal plane through the main axis of the engine and the longitudinal axis of the crosshead. The result obtained is that tipping torques emanating from the piston may easily be transmitted to the sliding guide of the housing without risk of edge pressures. Further, the piston cannot be subjected to side pressures resulting from the crosshead turning on its axis or from tipping of the crosshead.

Moreover, according to the invention, the slant may be so thick that the thrust blocks sliding on the edge surface of the slant touch said edge surface at any time of the slant rotating, without ever projecting over it. Hereby a perfect lubrication and hence increased reliability are obtained.

Finally, in accordance with the invention, the piston rod may be placed so that its longitudinal axis is coextensive with the longitudinal axis of the crosshead. As a result, it may be tolerated that a traditional connection between the piston rod and the piston may be established by way of a common crosshead bolt when the latter is arranged so that turns may be absorbed because of the edge pressure of the crosshead.

Figure 2:
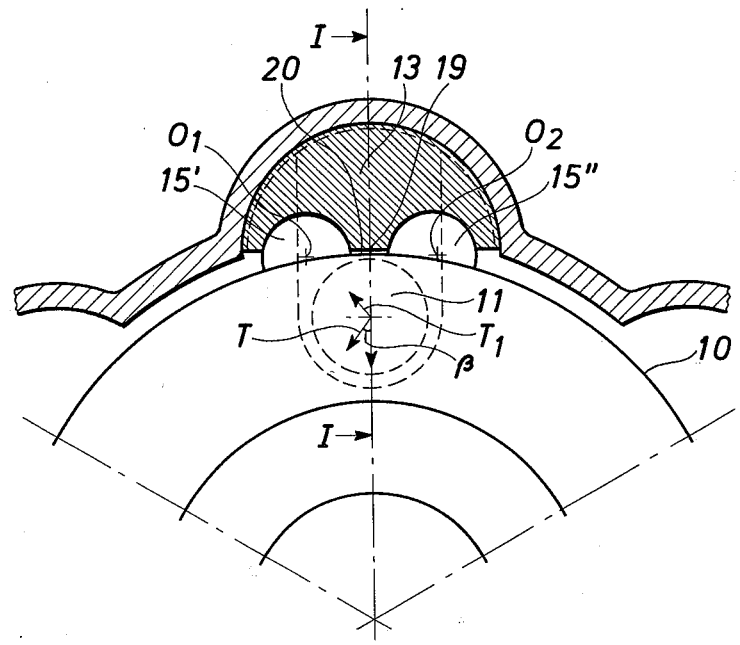

The invention will be described below with reference to the accompanying drawings, in which FIG. 1 is a part-sectional side elevational view of the mechanism according to the invention, only one cylinder with its piston rod and crosshead being indicated; the external short bearing supporting surface of the crosshead is clearly shown, FIG. 2 is a sectional view taken along the line 2—2 in the mechanism of FIG. 1

Figure 3:
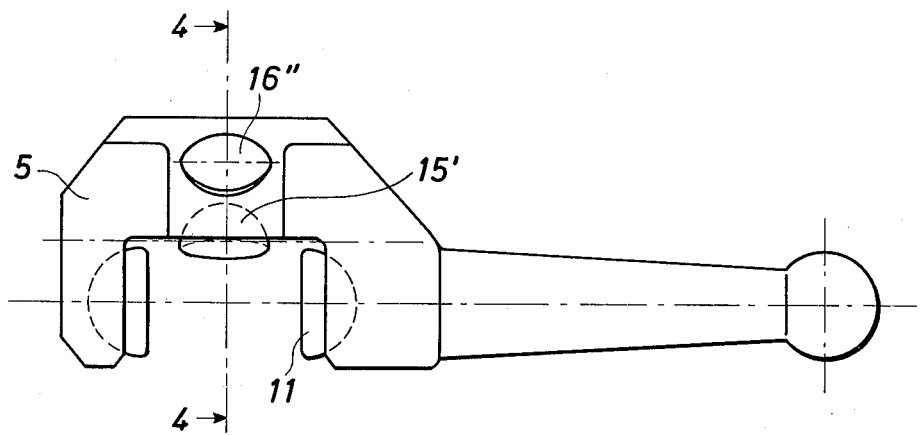
Figure 4:
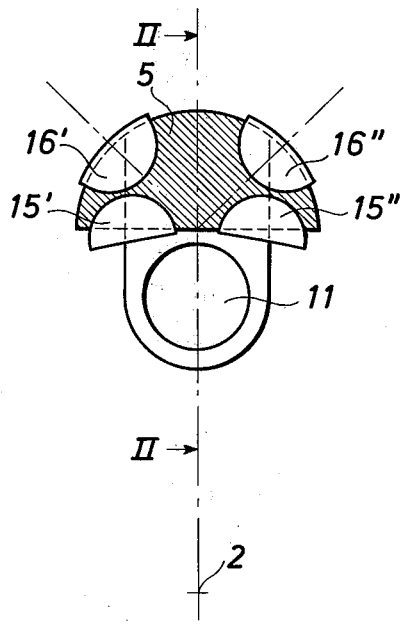
Figure 5:
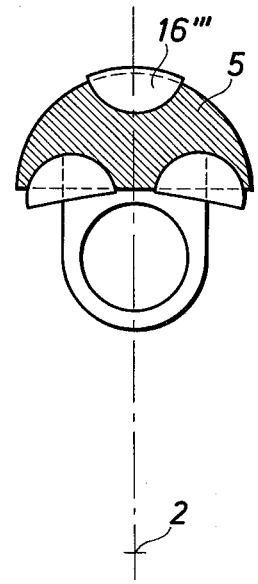
Figure 6:
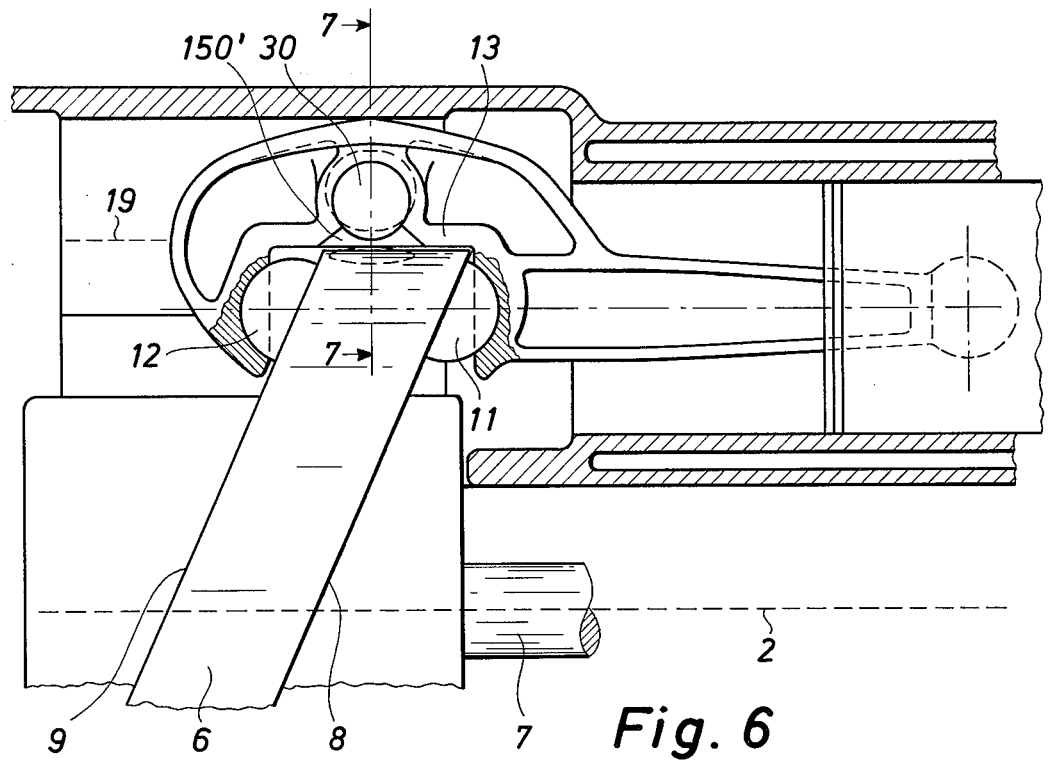
Figure 7:
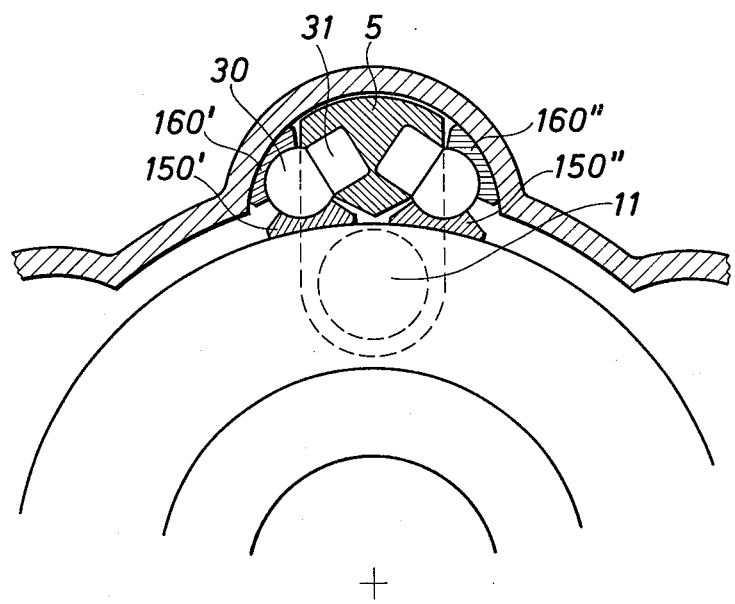
Figure 8:
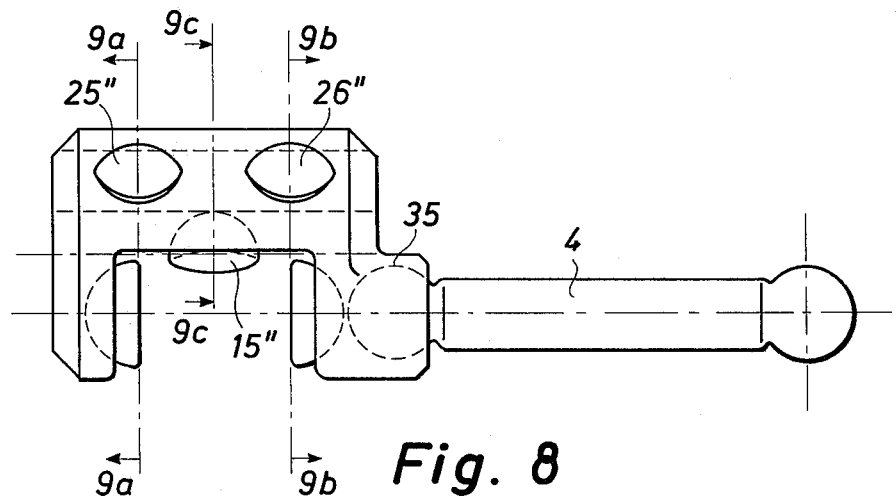
Figures 9, 10:
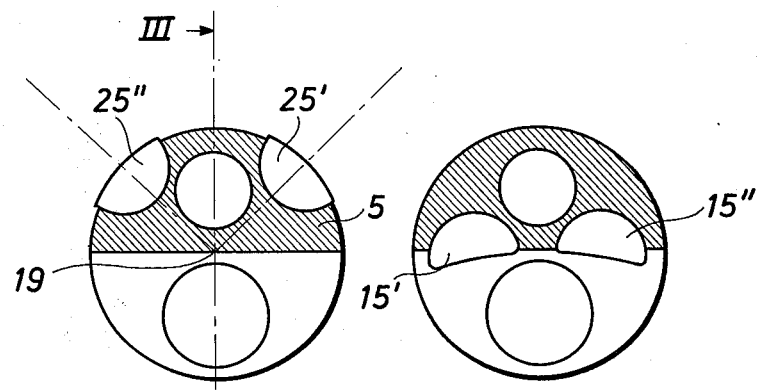
Figure 11:
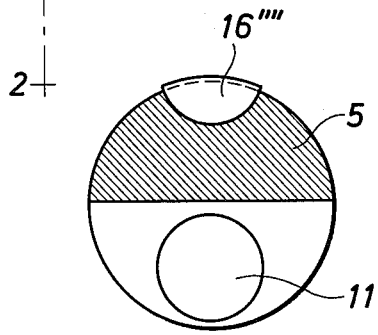

FIG. 3 is a side view of another embodiment of the mechanism according to the invention, in which the bearing supporting surface of the crosshead contains external thrust blocks and the piston rod is rigidly connected to the crosshead, FIG. 4 is a cross section taken along the line 4—4 of FIG. 3, FIG. 5 is a cross section taken along the line 4—4 of FIG. 3, the two external thrust blocks being replaced by one thrust block, FIG. 6 is a part-sectional side elevational view of a further embodiment of the mechanism according to the invention, in which the external thrust blocks and the thrust blocks sliding on the edge surface of the slant are paired off on a common ball-shaped supporting portion mounted in the crosshead, FIG. 7 is a cross section taken along the line 7—7 of FIG. 6, FIG. 8 is a side elevational view of a further embodiment of the mechanism according to the invention, in which two sets of external thrust blocks are provided and the piston rod is connected to the crosshead by way of a ball-and-socket joint, FIG. 9 is a cross section taken along the line 9a—9a or 9b—9b of FIG. 8, FIG. 10 is a cross section taken along the line 9c—9c of FIG. 8, and FIG. 11 is a sectional view corresponding to FIG. 9 and shows a further embodiment of the mechanism according to the invention, only one external thrust block being provided at either side of the line 9c—9c — cf. FIG. 8 — the external thrust block being situated as far away as possible from the main axis of the engine.

The power transmitting mechanism shown in FIG. 1 may be used in an internal combustion engine having a plurality of cylinders 1 arranged around its main axis 2. The axes 1a of the cylinders extend parallel to the main axis. Each cylinder contains a piston 3, which is connected to a crosshead 5 through a piston rod 4. The crosshead 5 is shaped as a claw having substantially U-form and gripping a pivotal slant or swash plate 6, which is rigidly connected to the main shaft 7, of which only a bit is shown. The slant has two parallel planar side surfaces 8 and 9, and a circular cylindrical edge surface 10. The edges of the side surfaces 8 and 9 consequently form ellipses. The surfaces 8 and 9 co-operate with a main thrust block 11 and a back thrust block 12, respectively, these blocks preferably being of the Michell type and being deposited in the two end portions of the claw-shaped crosshead. As appears from the drawing, the slant 6 projects into a gap 14 of the crosshead. At the bottom thereof, i.e. at the middle portion 13, two thrust blocks 15' and 15", both also of the Michell type, are mounted. Through these thrust blocks 15' and 15", the transverse force vector component pointing towards the main axis 2 may be transmitted to the cylindrical edge surface 10 of the slant 9. Individually or together with a relatively short external bearing supporting surface 16 of the crosshead, these thrust blocks may absorb the transverse components of the rotating transverse force vector T, since the bearing supporting surface co-operates permanently with an axially extending semicircular sliding guide 22 inside the housing 23 of the engine. The spot on which the transverse force vector acts and how the vector components move will be disclosed in detail below.

As appears from FIGS. 1 and 2, the centres $O_1$ and $O_2$ of the thrust blocks 15' and 15" are arranged in a plane perpendicular to the longitudinal axis 19 of the crosshead 5. The thrust blocks 15' and 15" ensure an efficient hydrodynamic lubrication between the edge surface 10 of the slant and the thrust blocks, and further ensure an adequate clearance 20 between the middle portion 13 of the crosshead and the edge surface 10 of the slant.

In FIG. 1 the transverse force component $T_o$ is equal to $Ptg\alpha$ and is perpendicular to the cylinder axis $1a$ going through the centre of pressure of the main thrust block 11. In the shown position of the slant 6 corresponding to the piston 3 being in its topdead-centre, the component $T_o$ passes through the main axis 2. If the slant 6 is now turned an angle $\beta$, the transverse force vector T, cf. FIG. 2, will turn a corresponding angle on the centre of pressure of the thrust block 11, the transverse force vector being permanently perpendicular to the cylinder axis $1a$. When turning, the vector alters its length owing to the variable gas pressure on the piston and the variable inertia force from the piston and the crosshead. The component $T_o$ of the transverse force vector acting on the crosshead 5 and pointing in towards the main axis 2, as shown in FIG. 1, is absorbed by the reactions from the slant 6 at the thrust blocks 15' and 15", and the tipping torque (around a line perpendicular to the drawing sheet in FIG. 1) acting upon the crosshead is absorbed by the housing 23 through the bearing supporting surface 16 and by the slant through the thrust blocks 15' and 15". When the slant 6 is turned the angle $\beta$ from its middle position, the outward component $T_1$ of the transverse force vector will subject the crosshead 5 to a torque around the longitudinal axis 19 of the crosshead, which is clearly shown in FIG. 2. However, the thrust blocks 15' and 15" together with the bearing supporting surface 16 will prevent said turn from being essential. With the indicated direction of $T_1$, the thrust block 15' will rise from the edge surface 10 whereas the thrust block 15" is actuated by a reaction from the edge surface 10.

The bearing supporting surface 16 has a semicircular cross section, cf. FIG. 2, and has a shape close to that of a barrel or possibly a sphere. As shown in FIG. 1, the surface 16 extends symmetrically about a transverse plane 2—2 through the centres of the thrust blocks 15' and 15". Further the bearing supporting surface extends symmetrically about a longitudinal plane I—I through the main axis 2 and the longitudinal axis 19 of the crosshead. As shown in FIGS. 3 and 4, the bearing supporting surface of the crosshead may have two external thrust blocks 16' and 16" whose centres are situated in the same transverse plane 4—4 as the centres of the thrust blocks 15' and 15". As appears from FIG. 4, the thrust blocks 16' and 16" are arranged substantially symmetrically about the longitudinal plane II—II through the main axis 2 of the engine and the longitudinal axis 19 of the crosshead — cf. FIG. 4. The thrust blocks 16' and 16" are arranged so close to the longitudinal edges of the semicircular bearing supporting surface that the force by which the crosshead acts upon the guide 22 will pendulate within an angle range of approximately +45° and —45° in relation to the plane II—II in FIG. 4. In normal operation of the engine all thrust blocks are hydrodynamically lubricated. As shown, there is an adequate clearance between the crosshead 5 proper and the opposite guide 22 as the thrust blocks 16' and 16" project a little over the crosshead.

As appears from FIGS. 6 and 7, a thrust block 150' sliding on the edge surface of the slant and an external thrust block 160' may be fastened to the same ball-shaped supporting portion 30. The latter is fastened centrally in the crosshead above the crosshead gap 14, i.e. in the middle zone 13, by way of a relatively thick shank 31. As a counterpart of the thrust blocks 150' and 160' in the left-hand part of FIG. 7, another pair of thrust blocks is provided in the right-hand part of that figure, which thrust blocks are also mounted on a ball-shaped supporting portion.

FIG. 8 shows another embodiment of the crosshead. The head is connected to the piston rod 4 by way of a ball-and-socket joint 35. In FIG. 8 the bearing supporting surface of the crosshead is provided with two sets of external thrust blocks 25', 25" and 26', 26", each set being arranged in its own transverse plane, i.e. the thrust blocks 25' and 25" are situated in the plane 9a—9a and the thrust blocks 26' and 26" are situated in the plane 9b—9b. The transverse planes 9a—9a and 9b—9b are arranged substantially symmetrically at either side of the transverse plane 9c—9c in which the centres of the thrust blocks 15' and 15" sliding on the edge surface 10 of the slant are. The distances, at which the planes 9a—9a and 9b—9b are arranged from the plane 9c—9c, are preferably greater than or equal to half of the thickness $t$ of the slant 6 measured in axial direction, cf. FIG. 1. As shown in FIG. 9, the two external sets of thrust blocks are arranged symmetrically in relation to a longitudinal plane III—III through the main axis 2 of the engine and a longitudinal axis 19 of the crosshead. FIG. 10 is a sectional view of the crosshead taken along the line 9c—9c.

In all the embodiments of the mechanism according to the invention, the slant is so thick $t$ — cf. FIG. 1 — that the thrust blocks 15' and 15" will touch the edge surface 10 of the slant at any time of the slant rotating; at no moment, the thrust blocks will project over that surface.

In the same way as the thrust block 16'''' is arranged as shown in FIG. 5, the thrust block sets 25', 25" and 26', 26" of FIG. 8 may be replaced by a single thrust block in either "set", cf. FIG. 11. In this case, the external thrust block is arranged as far as possible from the main axis of the engine.

It should be noted that the piston rod may be placed so that its longitudinal axis is co-extensive with the longitudinal axis of the crosshead. However, it is also possible to arrange the piston rod eccentrically in relation to the axis of the crosshead.

The invention may be modified in many ways without departing from its idea.

What we claim is:

1. A reciprocation-piston device such as an engine or pump and power transmitting mechanism therefor comprising a plurality of cylinders arranged circumferentially around the main axis of the device, the cylinder axes being parallel to the said main axis, each piston being connected to a claw-shaped crosshead by way of a piston rod, said crosshead being rotatable about its longitudinal axis and adapted to receive a swash-plate in a recess therein to operatively connect said crosshead and swash-plate, said swash-plate being fixedly secured to said main shaft at one end thereof and positioned between a main thrust block and a rear thrust block at the other end thereof, said main and rear thrust blocks being mounted eccentrically within said crosshead relative to the longitudinal axis of said crosshead, an axially extending guide slot within the housing for said cylinders, a semi-circular outwardly facing bearing surface provided on said crosshead slidable within said guide slot, a pair of second thrust blocks mounted symmetrically in said crosshead on opposite sides of a vertical longitudinal plane of said crosshead for absorbing the force components perpendicular to said main shaft whereby said crosshead is pivotally journalled around its longitudinal axis, the centres of said second thrust blocks being arranged in a plane perpendicular to the longitudinal axis of the crosshead and in the middle of said recess of the crosshead, the two second thrust blocks being adapted to slide on the end surface of said swash-plate within said recess, said end surface of the swash-plate and the overlying surfaces of said second thrust blocks being arcuate and complementary so that said second thrust blocks and said outwardly facing bearing surface of the crosshead absorb the transverse components of the rotational force developed.

2. A device according to claim 1, including at least one outwardly facing additional thrust blocks the centres of which are situated in a plane which is coincident with a plane containing the centres of said second thrust blocks and is perpendicular to said main axis.

3. A device according to claim 2, wherein said additional thrust blocks and said second thrust blocks are paired off on protruding ball-shaped supporting portions which are fastened to the crosshead centrally above the crosshead recess.

4. A device according to claim 1, wherein the crosshead and the piston rod are connected by way of a ball and socket joint, said additional thrust blocks comprising two sets of outer thrust blocks each set being arranged in separate transverse planes and positioned substantially symmetrically around and spaced from the transverse plane in which the centres of said second thrust blocks are situated, said spacing being at least equal to half of the swash-plate thickness measured in an axial direction, each said set of thrust blocks consisting of at least one thrust block arranged symmetrically about a vertical longitudinal plane through said main axis and the longitudinal axis of the crosshead.

* * * * *